Jan. 23, 1934.　　　　K. E. PEILER　　　　1,944,866
METHOD OF AND APPARATUS FOR FORMING GLASSWARE
Filed March 19, 1929　　　4 Sheets-Sheet 4
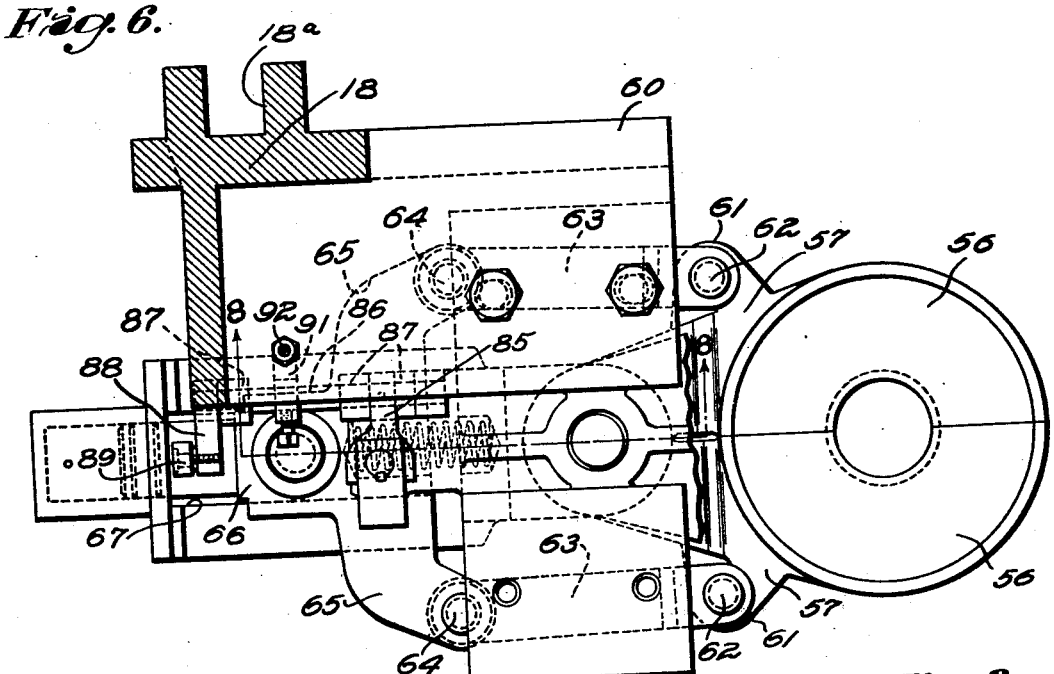
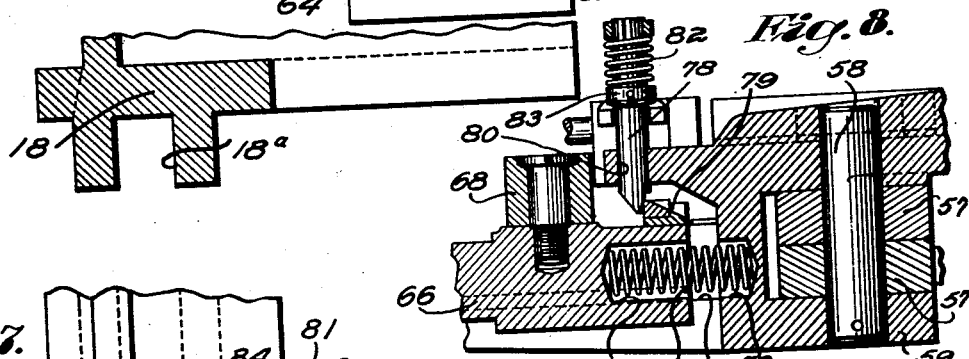
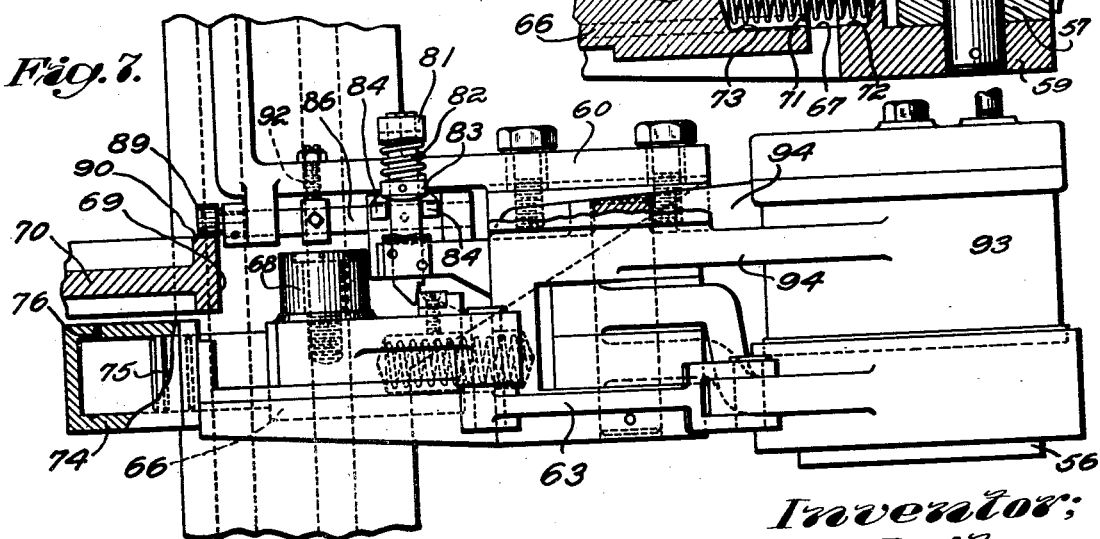
Inventor;
Karl E. Peiler,
by Brown + Parlow
Attorneys.
Witness;
W. B. Thayer Patented Jan. 23, 1934

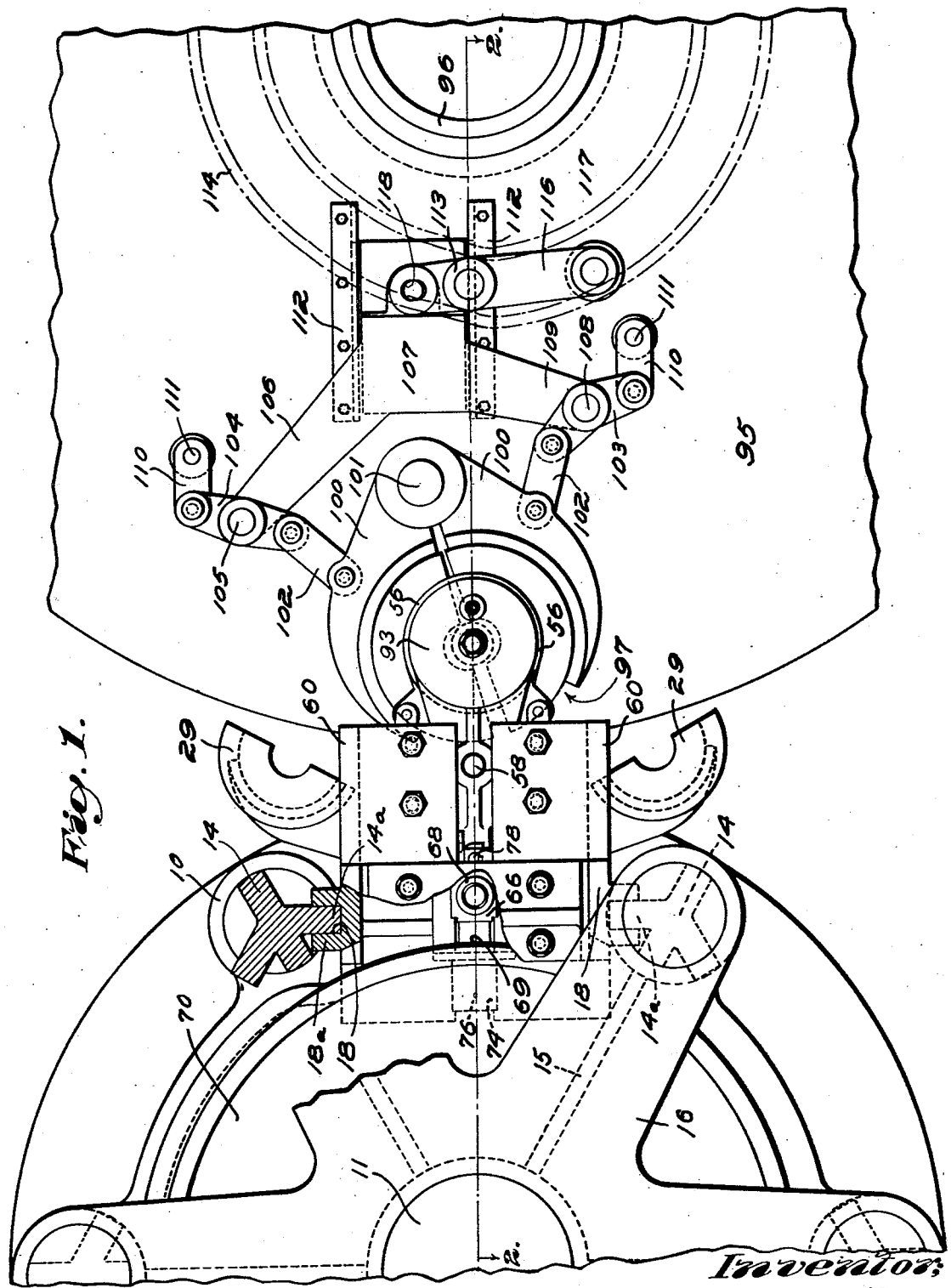

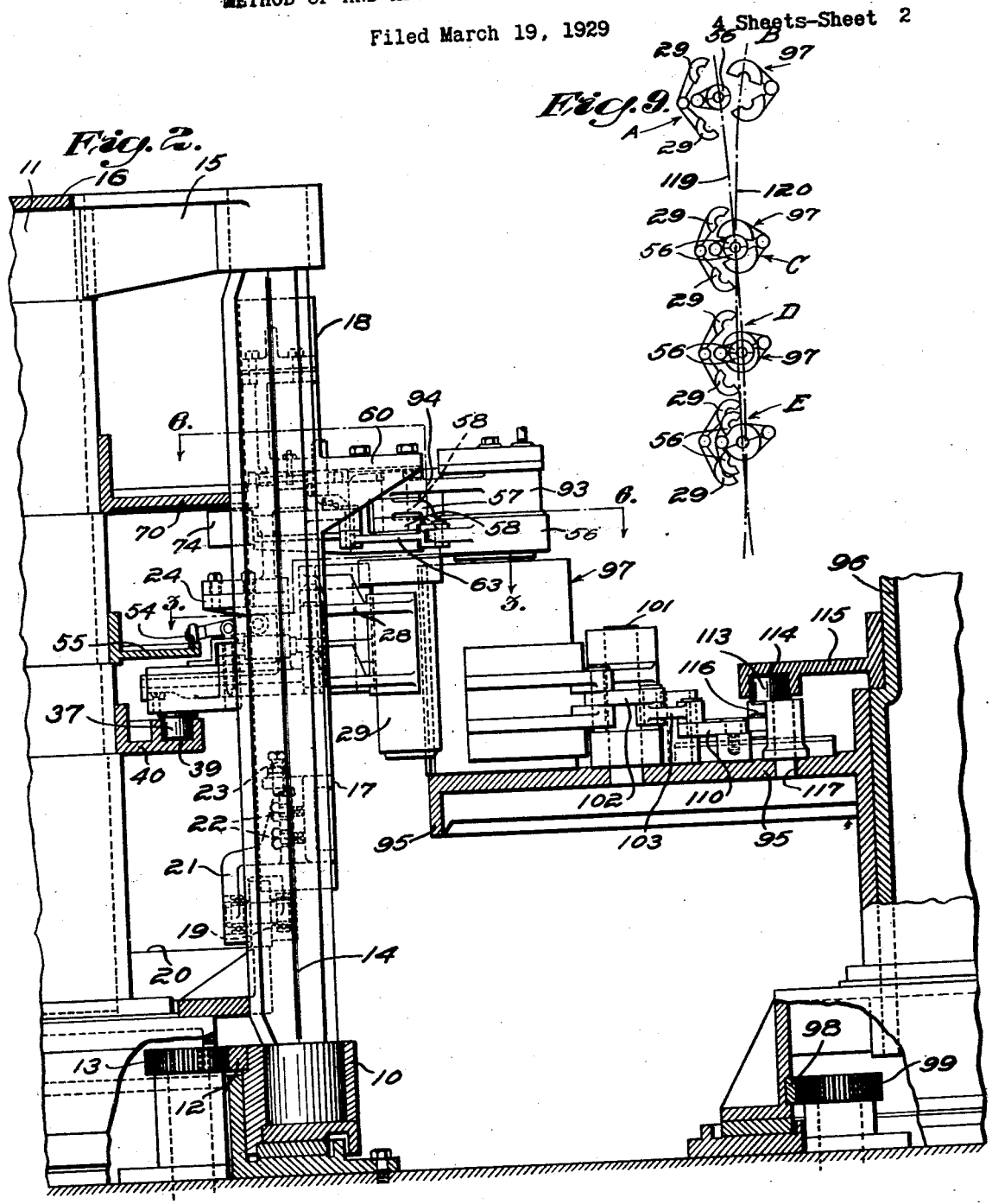

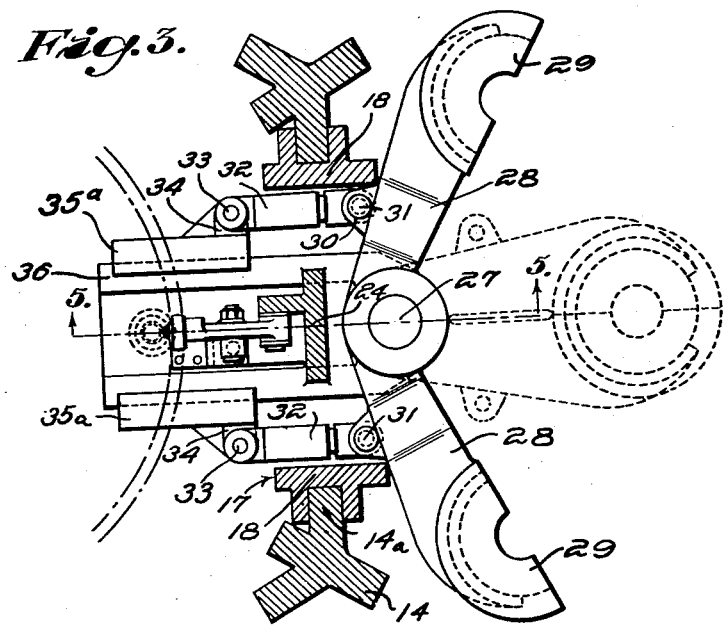
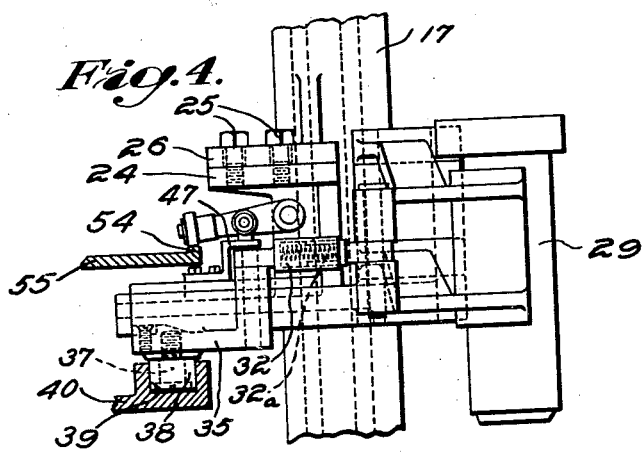
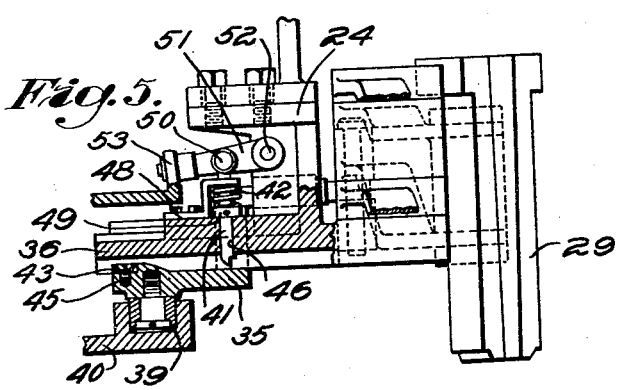

1,944,866

UNITED STATES PATENT OFFICE 1,944,866

METHOD OF AND APPARATUS FOR FORMING GLASSWARE

Karl E. Peiler, West Hartford, Conn., assignor to Hartford-Empire Company, Hartford, Conn., a corporation of Delaware Application March 19, 1929. Serial No. 348,190

45 Claims. (Cl. 49—9)

My invention relates generally to the manufacture of articles of hollow glassware and more particularly to glass making apparatus of the type which comprises two adjacent continuously rotating tables or carriers, one of which carries parison forming units, each comprising a separable divided parison body and a parison neck ring or mold, while the other carries cooperating divided finishing molds adapted for the reception of the parisons that are formed in the units on the first table.

In the operation of a continuous two-table glass making machine of the general type above mentioned, suitable mechanism is provided for controlling the opening of the parison body and parison neck molds, respectively, so that each parison body mold may be opened as it approaches a station at which the transfer of the parison to a finishing mold on the finishing mold table is to be effected, thus leaving the parison suspended from the closed parison neck mold. The transfer station is located at or adjacent to a point of tangency or intersection of the paths of the molds on the respective tables.

Such a machine is disclosed in my copending application Serial No. 87,800, filed February 12, 1926, in which the transfer of the suspended parison is effected by the direct cooperation of the neck mold and the blow mold. To the extent that common subject matter appears in the present application and the aforesaid application Serial No. 87,800, this application is a continuation in part of such earlier application.

It has been proposed prior to the present invention to effect transfer of a parison from a neck mold on one table to a finishing mold on an adjacent table by a separate transfer mechanism, such for example as that disclosed in Patent No. 1,245,262, granted November 6, 1917, to Michael J. Owens. Also I have heretofore proposed to cause the parison supporting closed neck mold or the finishing mold to move radially on its supporting table as required to secure substantial coincidence of travel of the parison and the finishing mold during the transfer of the parison to the finishing mold. Apparatus in which a radial movement of the parison supporting neck mold on its supporting table is an incident of the parison transfer is disclosed in my copending prior application, Serial No. 323,955, filed Dec. 5, 1928, while an apparatus in which the finishing mold is shifted radially on its table for the parison transfer operation is disclosed in my copending prior application, Serial No. 323,954, filed Dec. 5, 1928, now Patent No. 1,833,302.

One object of my invention is to provide a method and a machine for forming glassware, wherein the blank mold table and the blow mold table are continuously rotated side by side with the molds of the two tables at approximately the same level at the time of transfer, and wherein the blanks are transferred from the blank molds to the blow molds without the use of tongs or other special transfer mechanism, the parisons being in neck-up position throughout the entire transfer operation.

An object of the present invention is to provide in a continuous two-table apparatus improved and simplified mechanism for controlling the operations of cooperative parison forming units and finishing molds at the parison transfer station so that the transfer of parisons from such units to the finishing molds may be effected without requiring radial movements of either the parison forming unit or the finishing mold on its respective table or the use of a separate parison transfer mechanism and without causing any harmful lateral distortion or flexure of any portion of the parison at the time of the transfer.

A more specific object of the present invention is the provision in a glass forming machine of the character described of mechanism adapted to cause the sections of a divided parison neck ring or mold from which a parison is suspended to snap open instantly when a finishing mold is closed about such parison, thereby obviating any lateral flexure of or bending stress on the neck portion of the parison as the paths of movement of the neck ring or mold and of the finishing mold diverge after the closing of the finishing mold about the parison.

A further object of the invention is a provision in a continuous two-table machine of the type above described of improved means for mounting and operating the sections of a divided or sectional finishing mold on one of the tables and for controlling the movement of a parison suspending neck mold on the other table as such tables rotate about different centers so that the sections of the finishing mold may be closed about the moving suspended parison without causing any lateral stress on such parison during the closing of the finishing mold or while the parison is supsended from the neck mold.

Other objects and advantages of the invention will be apparent from the following description, when it is considered in conjunction with the accompanying drawings, in which:

Figure 1 is a fragmentary plan view of a continuous two-table glass forming machine embodying the present invention, showing a parison forming unit and a cooperating finishing mold at a station for the transfer of a parison to the finishing mold, the view being partly in horizontal section with parts of the structure on the parison table broken away to reveal parts which would otherwise be hidden;

Fig. 2 is a fragmentary vertical sectional view taken substantially along the line 2—2 of Fig. 1;

Fig. 3 is a horizontal sectional detail view taken substantially along the line 3—3 of Fig. 2 and showing the mechanism for supporting and controlling the opening and closing movements of the sections of the parison body mold;

Fig. 4 is a vertical sectional view of the structure shown in Fig. 3, the view being taken substantially along the line 4—4 of Fig. 3;

Fig. 5 is a view similar to Fig. 4 but taken substantially along the line 5—5 of Fig. 3;

Fig. 6 is an enlarged horizontal sectional view taken substantially along the line 6—6 of Fig. 2 and showing the mechanism for controlling the opening and closing movements of the parison neck mold;

Fig. 7 is a view mainly in side elevation and partly in vertical section, showing the structure exhibited in Fig. 6 with portions broken away substantially as it appears looking at such structure from the bottom of Fig. 6;

Fig. 8 is a fragmentary vertical sectional view substantially along the line 8—8 of Fig. 6, illustrating particularly the mechanism for releasably holding the parison neck mold sections closed, and Fig. 9 is a graphic representation in a general way of the relative positions of the parts of a parison forming unit and a cooperative finishing mold during the portions of the movements of the two tables which are required for the transfer of a parison from the parison forming unit to the finishing mold.

A glass forming machine embodying structural features of the present invention may comprise a rotary parison table or carrier 10, Figs. 1 and 2, mounted in any suitable known manner for rotation about the axis of a vertical column 11. The rotary frame 10 is shown in Fig. 2 as being provided with an internal ring gear 12 with which a pinion 13 is engaged, the latter being adapted to be driven by any suitable mechanism, not fully shown. The carrier 10 supports standards 14 which are spaced circumferentially of the carrier 10 and are located adjacent to the periphery of the latter. The standards 14 preferably are stayed at their upper ends by the arms 15 of a spider 16 which is mounted on the column 11 for rotation with the carrier 10.

As shown to advantage in Fig. 1, adjacent standards 14 may have at their adjacent sides aligned projections 14a which serve as guides for a vertically slidable frame or carriage 17 on which the members of a parison forming unit and certain of the associate operating parts for such members are supported, in a manner to be presently described. Only one frame 17 and one parison forming unit and its associate parts are shown in the drawings but it will be understood that the table 10 may carry a plurality of such frames, units, and associate parts. The vertically slidable frame or carriage may have vertically extending side members 18 having portions formed to provide vertical grooves or channels 18a into which the guide portions 14a of the standards 14 extend so that each vertically slidable frame is retained against any appreciable radial movement relatively to the supporting carrier 10.

The vertical movements of the slide frame 17 are controlled by the movements of a cam roll 19, Fig. 2, on a stationary cam track 20 which encircles the axis of rotation of the carrier 10. The cam roll 19 is carried by an arm 21 which is secured to the lower end portion of the vertically slidable frame 17 by the screws 22 and at its upper end abuts a vertically adjustable stop screw 23 which is carried by a lug on the slide frame 17. By loosening the screws 22 and adjusting the stop screw 23, the path of vertical reciprocation of the frame 17 and of the parts supported thereon may be adjusted within limits without changing the configuration of the working surface of the cam 20.

The side members 18 of the slide frame 17 are spaced sufficiently far apart for part of the length of the slide frame to accommodate the structure on which the parts of the parison forming unit and their operating mechanisms are supported (see Fig. 3). Such supporting structure may comprise a bracket 24 fastened by the cap screws 25, or like fastening devices, to substantially horizontal lugs, as at 26, which may be integral with the side members 18 of the slide frame. The bracket 24, or an extension thereof, carries a vertical pivot pin 27 on which the arms 28 of the holders for the half sections 29 of the two-part parison body mold are pivoted. Ears 30 on the arms 28 are pivotally connected at 31 with the outer ends of links 32. The inner ends of the links 32 are pivotally connected at 33 with outturned ears 34 on a radially slidable block 35, Fig. 4. The radially slidable block 35 has guiding and retaining portions 35a arranged to embrace and slidably contact with the lateral edge portions of a radially extending supporting plate 36 which may be an integral portion of the bracket 24 or secured to the latter in any suitable known manner. The radially slidable block 35 carries a depending stud 37 on which is mounted a roll 38 that runs in a cam groove 39 at the upper side of a stationary cam web 40 which may be secured to the column 11. The link 32 preferably is of two part construction, the parts thereof being capable of limited relative longitudinal movements and being urged to the limits of their relative movements in one direction by a spring 32a, as shown generally in Fig. 4, so that the radial outward movement of the block 35 to effect closing of the halves of the parison body mold will be effected through motion transmitted through the spring 32a to the halves of the parison body mold, which thus will be closed resiliently. Also the link 32 permits a slight lost motion in the mechanism for closing the parison body mold. Should any obstruction tend to interfere with the complete closing of the halves of the parison body mold, the spring 32a will yield sufficiently to prevent breaking of any of the parison body mold operating parts.

It, of course, is to be understood that the cam groove 39 is laid out so that the block 35 will be moved radially outward and inward as required to cause opening and closing of the halves of the parison body mold at the proper times in the cycle of rotation of the parison table 10. The cam 20 may be laid out to raise and lower the carriage 17 and the parison forming unit thereon at the proper times in the cycle of rotation of the table 10 to cause the lower end of the closed body mold to be moved over a wall of a container for a pool of molten glass (not shown), lowered to the surface of such pool, and raised from the pool to clear the opposite wall for the pool after a glass gathering operation has been effected. Since the carriage 17 moves vertically during a cycle of rotation of the table 10 and the cam web 40 is stationary, it is desirable that a gap should be provided in such cam web at the proper place to permit the required vertical movements of the carriage 17 and of the parts which are supported thereon. This raising and lowering of the carriage 17 may be effected while the parison body mold is closed and in order to prevent accidental opening of the parison body mold at that time, the cam roll 37 then being out of contact with the cam groove 39, a vertically movable latch pin 41, Fig. 5, may be pressed by a spring 42 to position to engage an abutment 43 on the slide block 35 when the latter has been moved radially outward from the position shown in Fig. 5 as required to effect closing of the halves of the parison body mold. Return or radially inward movement of the slide block 35 to effect opening of the halves of the parison body mold then will be prevented until the latch pin 41 has been raised. The abutment 43 may comprise a hardened insert secured by a screw 45 to the slide block 35, as shown to advantage in Fig. 5. The vertically movable latch pin 41 is guided in its vertical movements by a vertical opening 46 through the supporting plate 36 and by a vertical opening through a horizontal portion 47 of a bracket 48 that is secured on the plate 36. A stop collar 49 on the latch pin rests on the plate 36 when the latch pin is in its downwardly projected or latching position, to which it is urged by the spring 42. The spring 42 encircles the latch pin between the portion 47 of the bracket 48 and the collar 49 while the upper end portion of the latch pin is pivotally connected, as at 50, to a lever 51 that is fulcrumed at 52 on a portion of the bracket 24. The lever 51 carries a cam roll 53 that rides on a cam 54 formed on a web plate 55 which may be secured to the column 11. The cam 54 and its supporting web plate 55 will not extend completely around the column but will be broken away at one place to permit the vertical movements aforesaid of the carriage 17. However, at the proper time in a cycle of rotation of the carriage 10, the cam roll 53 will ride up an inclined portion of the cam 54 so as to lift the latch pin 41 above the abutment 43 and to hold such latch pin in its lifted position while the slide block 35 is moved radially inward by the engagement of the cam roll 37 with the cam track 39 to open the halves of the parison body mold.

The parison forming unit includes a parison neck mold comprising the cooperative half sections 56 carried by holders having arms 57 mounted on a vertical pivot element 58. The pivot element 58 may be carried by a supporting block 59 which may be secured to a bracket 60 that in turn is secured to the vertically slidable frame 17. The arms 57 of the holders for the neck mold sections have ears 61 connected pivotally at 62, Fig. 6, to links 63 which in turn are connected pivotally at 64 to the lateral branches or arms 65 of a slide block 66. The slide block 66 is mounted for movement in a radial slideway 67 formed in a portion of the supporting block 59, Figs. 6 and 7. A cam roll 68 is supported at the upper side of the slide block 66 and is adapted to contact with a lateral cam track 69 on a stationary plate 70 during part of the cycle of rotation of the carriage 10 to effect closing of the halves of the parison neck mold. The plate 70 may be secured to the stationary column 11 and may extend partly around the latter.

An expansion spring 71 has its outer end disposed in a pocket 72 in the supporting block 59 and its inner end disposed in a pocket 73 in the slide blocks 66, Fig. 8. This spring 71 preferably is under compression continuously and tends to urge the slide block 66 radially inward to effect opening of the halves of the parison neck mold and until the cam roll 68 is in position to contact with the cam track 69. A dash pot cylinder 74 is carried by the supporting block 59 or an extension thereof so that a piston 75 that is secured to the inner end of the slide block 66 will reciprocate in the dash pot cylinder as the slide block 66 moves radially to open and close the halves of the parison neck mold. The dash pot cylinder 74 is provided with a vent 76 so that the radially inward movement of the slide block 66 to effect opening of the halves of the parison neck mold will be substantially free or unretarded under the actuation of the spring 71 until the neck mold halves are practically fully opened, at which time the inner end of the piston 75 will pass beyond the vent 76 and close the latter and further radial movement of the slide block 66 will be cushioned by the air in the inner end of the cylinder 74 as the cam roll 68 is moved into contact with the cam 69, thereby preventing any harmful impact as the cam roll moves against the cam.

When the slide block has been moved radially outward to effect closing of the halves of the parison neck mold, a vertically movable latch pin 78, Fig. 8, will engage with an abutment 79 on the outer end of the slide block 66 to releasably hold the slide plate in its outwardly projected position and thus to maintain the halves of the parison neck mold closed. The abutment 79 may comprise an insert of relatively hard metal or other suitable material. The vertically movable latch pin 78 may be guided in its vertical movements by an opening 80 in a portion of the supporting block 59 and by an opening in a stop member 81 with which the upper end portion of the latch pin is slidably engaged. A spring 82 is coiled about the latch pin 78 between a stop collar 83 and the stop member 81 and tends to urge the latch pin 78 to its downwardly projected or latching position, as shown in Fig. 8. The forks 84 of a rocker arm 85, Fig. 6, embrace the latch pin 78 below the collar 83. The rocker arm 85 is carried by a rock shaft 86 that is mounted in bearings in lugs 87 on a portion of the supporting block 59. The rock shaft 86 extends in a generally radial direction and the inner end portion thereof is provided with a rocker arm 88 that extends laterally from the rock shaft at the same side of the latter as the rocker arm 85 and is provided with a cam roll 89 adapted to ride on a cam track 90 which may be formed on the cam web 70. When the cam roller 89 rides up an inclined portion of the cam track 90, the raising of the rocker arm 85 will cause the latch pin 78 to be raised, thereby releasing the slide block 66 which is moved quickly in a radially inward direction by the spring 71 so as to cause the halves of the parison neck mold to be snapped open. Since the cam members 69 and 90 do not extend entirely around the column 11 but are formed to provide gaps to permit the vertical movements of the carriage 17, it is desirable that the downward movement of the cam roller 89 should be limited after such cam roller disengages the cam 90 so that contact of the cam roller with the adjacent end of the cam 90 may be re-established at the proper time. To this end, a rocker arm 91 may be provided at the opposite side of the rock shaft 86 from the arms 85 and 88 and a vertically adjustable stop screw 92 may be arranged to bear against the upper side of the outer end of the rocker arm 91 so as to regulably control the possible downward swinging movement of the cam roller 89 when the latter disengages its associate cam 90. The adjustable stop screw 92 may be carried by a portion of the bracket 60.

A head 93 which may be adapted by suitable connections, such as are well known in the art, for connection with sources of sub-atmospheric and superatmospheric pressures at different times, may be carried by supporting arms, such as 94 on the supporting block 59, in position to have substantially fluid tight contact with the upper end of the parison neck mold when the latter is closed as shown in Figs. 2 and 7. The control of the application and exhaust of the sub-atmospheric and super-atmospheric pressures to the head 93 may be effected in any suitable known manner.

The glass forming apparatus also includes a rotary finishing mold table 95 that is mounted in any suitable known manner for rotation about the axis of a vertical column 96 so that the paths of a finishing mold 97 on the table 95 and of a parison that may be suspended from a closed parison neck mold on the parison table will be tangent to each other or will slightly overlap or closely approach each other during corresponding parts of the cycles of rotation of the tables 10 and 95. The rotation of the table 95 may be effected in any suitable known manner synchronously with the rotation of the table 10. In Fig. 2, the hub portion of the table 95 is shown as being provided with an internal gear 98 in mesh with a pinion 99 which may be driven in synchronized relation with the pinion 13 by suitable known means, not shown.

The finishing mold 97 comprises a pair of halves carried by holders on arms 100, Fig. 1, which are mounted on a vertical pivot pin 101 on the table 95. Links 102 pivotally connect the arms 100 with cross arms or levers 103 and 104, respectively. The member 104 is pivoted intermediate its length at 105 on the outer end of an arm 106 on a slide block 107. The member 103 is pivoted intermediate its length at 108 on the outer end portion of an arm 109 which also projects from the slide block 107 but at a slightly different angle from the radial than the arm 106. The inner ends of the members 104 and 103 are pivotally connected with links 110 which are mounted at their inner ends on pivot elements 111 fixed on the table 95. The slide block 107 is mounted for sliding movement in a guideway between the guiding and retaining members 112 on the table 95 so that the halves of the finishing mold will be closed at a vertical plane slightly oblique to the radial when the block 107 is at the limit of its outward movement. The halves of the finishing mold will be swung open as the block 107 moves inward between the guide members 112. This sliding movement of the block 107 is controlled by the contact of a cam roll 113, Fig. 2, with a cam track 114 on a plate 115 which may be secured to the column 96 and may surround the axis of rotation of the table 95. The cam roll 113 is mounted on a lever 116 which is fulcrumed at one end at 117 on the table 95 and is pivotally and loosely connected at its other end as at 118 with an ear on the inner end of the slide block 107.

The operation of the improved apparatus may be substantially as follows:

The parison forming unit on the rotating table 10 is supplied with the charge of molten glass at the proper time in the cycle of rotation of such table. The particular apparatus which has been described in detail is designed particularly for the gathering of the charge of glass from a gathering pool by suction but it is to be understood that the parison forming unit might readily be designed to be charged with glass in any other known manner, as by hand feeding or by the operation of a suitable automatic feeder. In that event, such parison forming unit probably would be adapted to be inverted at the time it receives its charge and suitable means would be provided for compacting the glass in the parison forming unit at the proper time and for partially expanding the glass therein. After the charging of the parison forming unit and the partial expansion of the glass therein, the rotation of the table 10, as for example in a clockwise direction as viewed in Fig. 1, will bring such unit toward the transfer station. The halves of the parison body mold are opened in the manner hereinbefore described, as at the position indicated at A in the graphic showing in Fig. 9, as such parison forming unit approaches the transfer station. The parison then is suspended from the closed parison neck mold. As the cycle of rotation of the table 10 continues, the path of movement of the suspended parison, indicated at 119 in Fig. 9, will intersect the path of movement, indicated at 120, of the finishing mold on the finishing mold table, which is rotating in a counter-clockwise direction as viewed in Fig. 1. The finishing mold is open at the position B in Fig. 9 and may be partially closed about the suspended parison when the paths 119 and 120 intersect at the position C in Fig. 9. Thus, the finishing mold begins to close about the suspended parison at the proper predetermined time in the cycle of rotation of the two tables to assure the transfer of the parison without objectionable distortion or uneven contact of walls of the mold with such parison. At the position C of Fig. 9, the halves of the finishing mold are partially closed but the parison is still suspended from the closed parison neck mold. The paths 119 and 120 then extend in nearly coincident relation to the position E, at which position the closing of the halves of the finishing mold may be completed. At the instant of closing of the finishing mold about the parison, the slide block 66 of the parison neck mold opening mechanism is released from the latch pin 78 and the spring 71, Fig. 8, acts instantly to snap the halves of the parison neck mold open so that the lack of exact coincidence of the paths of the parison neck mold and the finishing mold thereafter will not cause any lateral distortion or flexure of any portion of the parison, which now is supported solely in the finishing mold. The neck mold is shown fully opened at the position E in Fig. 9, the parison being carried in the fully closed finishing mold. The paths 119 and 120 of the parison forming unit and the finishing mold being to diverge shortly after movement of such parts past the position E, as indicated in Fig. 9, but since the parison neck mold has been opened, such divergence will not cause contact of the parison forming unit with the parison in the finishing mold. It will be noted that the leading pivoted half section of the finishing mold has its outer edge slightly inward of the outer edge of the other or following half portion of the finishing mold as such sections of the finishing mold are moved to position to surround the pendant parison at the station C, in Fig. 9, thereby obviating any possible contact of the edge of the leading section of the finishing mold with the parison as the paths 119 and 120 approach each other at the station C. It also will be noted from the showing in Figs. 1 and 9 that the movement of the suspended parison, after leaving the position C and before the finishing mold is fully closed is between the widest part of the space between the closing finishing mold halves, thus tending to obviate contact of the parison with any part of the finishing mold until the finishing mold halves are closed, as at the position E in Fig. 9.

The arrangement of the finishing mold with the joint thereof at an angle to a radial line through the axis of the mold cavity, also is advantageous in a two-table forming machine, because such an arrangement makes it unnecessary to open the finishing mold to a very great extent at the beginning of the transfer of a parison from a parison forming unit to the finishing mold. In other words, the amount of movement of the mold halves to open the mold is substantially reduced and as a result, the complete closing of the blow mold and hence of the entire transfer operation may be effected more rapidly than otherwise would be the case. The arrangement of the finishing mold as above described, is of especial utility when plural cavity or plural neck molds, parison molds and finishing molds are employed, because in simultaneously transferring a plurality of parisons between two continuously rotating tables, it is difficult as a practical matter to reduce the extent of opening of the molds and at the same time provide for clearance between them, and still perform the transfer operation efficiently and rapidly. Therefore, a divided mold, having its joint at an angle to a radial line through the axis of the mold cavity is adequately suited to and particularly useful in the transfer of a plurality of parisons simultaneously.

The finishing mold table may carry a blow head, not shown, for use in an ordinary manner in combination with the finishing mold to effect the blowing of the parison to finished form in the finishing mold or such parison may be fabricated in the finishing mold in any other suitable known manner.

It will be understood that in order to practice the invention as above suggested with the paths of the neck molds and blow molds substantially tangent, the structure shown need be modified merely by slightly separating the two tables so that the paths 119 and 120 of Fig. 9 will be tangent at the point D which is on the line of centers of the tables.

In effecting the transfer with the machine so modified, it will be obvious that the blow mold will be partially closed about the suspended parison prior to the arrival of the molds upon the line of centers (the point of tangency) and may be finally closed at approximately the point of tangency and before the paths 119 and 120 diverge to a material extent, the neck ring being opened as described to completely release the parison to the blow mold.

It also will be understood that when the apparatus is intended for use in connection with a gathering pool of molten glass from which a charge is drawn into the parison forming unit at the proper time in the cycle of rotation of the table 10, suitable cooperating elements, such as a cut-off knife, not shown, or shears may be provided for severing the string or neck of glass between the gathered charge and the glass of the pool and that a bottom plate, not shown, likewise may be provided for closing the lower end of the parison body mold to permit partial expansion of the glass therein by superatmospheric pressure fluid or such partial expansion of the glass in the parison body mold may be effected against the cut-off knife while such knife remains in a glass supporting position at the bottom of the parison mold. Since any suitable cut-off knife and/or bottom plate and operating mechanism therefor may be employed, as are well known in the art, such parts and their operating mechanism have not been illustrated in the drawings.

Many modifications and adaptations of the form of construction shown in the drawings and of the features of the invention may be provided to adapt the invention to different uses or different conditions of service without departing from the spirit and scope of the invention, as set forth in the appended claims.

I claim:

1. In a glass forming machine, a neck mold traveling in a closed path and comprising a pair of separable sections adapted when closed to support a glass parison, means for closing said sections at a predetermined place in each cycle of travel of the neck mold, spring means tending to open said sections instantly, a latch tending to prevent the opening of said sections by said spring means, a finishing mold traveling in a closed path having a portion adjacent to the path of travel of the neck mold, said finishing mold comprising a pair of separable sections adapted to be closed about the parison supported by said neck mold at the place of proximity of said neck mold and said finishing mold to each other, and cam actuated means for actuating said latch to permit instant opening of said neck mold when said finishing mold is closed about said parison.

2. In a glass forming machine, a traveling neck mold comprising a pair of separable sections adapted when closed to support a glass parison, a slide block connected with said sections to effect opening and closing of the sections on predetermined movements of the slide block relatively to the path of travel of the neck mold, cam actuated means for moving said slide block to effect closing of the neck mold sections, a spring pressed latch for engaging said slide block to maintain said sections closed, a spring acting continuously on said slide block to tend to move the latter as required to effect instant opening of said sections, cam actuated means for moving said latch out of engagement with said slide block at a predetermined place in the travel of the neck mold to permit instant opening of the neck mold sections, and means for retarding movement of said block near the end of opening movement of said sections.

3. In a glass forming machine, a traveling neck mold comprising a pair of separable sections adapted when closed to support a glass parison, a slide block connected with said sections to effect opening and closing of the sections on predetermined movements of the slide block, cam actuated means for moving said slide block to effect closing of the neck mold sections, a spring pressed latch for engaging said slide block to maintain said sections closed, a spring acting continuously on said slide block to tend to move the latter as required to effect instant opening of said sections, cam actuated means for moving said latch out of engagement with said slide block at a predetermined place in the travel of the neck mold to permit instant opening of the neck mold sections, and means providing an air cushion at the end of the spring actuated movement of the slide block.

4. In a glass forming machine, a carrier mounted to rotate about a vertical axis, means for continuously rotating said carrier in one direction, a parison forming unit supported for travel with said rotary carrier and comprising a separable parison body and parison neck mold, each comprising separable sections, means for closing the sections of said parison body and said parison neck mold to permit a charge of glass to be formed therein into a parison, means for opening the sections of the parison body mold to leave the parison suspended from the neck mold, a second carrier mounted to rotate about a vertical axis adjacent to the first named carrier, means for continuously rotating said second carrier in a direction opposite to the direction of rotation of the first-named carrier, a finishing mold on said second carrier in position to be brought by the rotation of the second carrier adjacent to the path of movement of the suspended parison, said finishing mold comprising a pair of separable sections, means for closing the sections of the finishing mold about the suspended parison at the proper time in the cycles of rotation of the two carriers, and snap-acting means for instantly opening the sections of the parison neck mold when the sections of the finishing mold have been closed.

5. In a glass forming machine, two adjacent tables mounted to rotate continuously about two different vertical axes, a parison forming unit on one of said tables, including a neck ring comprising separable sections adapted when closed to support a suspended glass parison during part of the cycle of rotation of the parison table, a finishing mold on the second rotating table, said finishing mold comprising a pair of half sections mounted to close about the suspended parison at a vertical plane oblique to a radius of the finishing mold table when the finishing mold and the parison supporting neck ring are adjacent to each other, said tables rotating in opposite directions about their axes so that the outer edge of the leading section of the finishing mold will be located slightly inward of the other edge of the other section of the finishing mold and said parison will move in a direction extending between the widest part of the space between the finishing mold sections as such sections are closed about the suspended parison, and means for opening the neck mold to release the parison when the finishing mold sections have been closed.

6. In a glass forming machine, a table rotating about a vertical axis, a mold comprising a pair of sections pivotally supported on said table, a slide block movably supported on said table, cam actuated means for reciprocating said slide block as said table rotates, and means connecting said slide block with said sections of the mold for periodically closing said sections at a vertical plane slightly oblique to the radial and for periodically opening said sections during each cycle of rotation of said table.

7. A glass forming machine comprising a carrier, a parison forming unit mounted on said carrier, a second carrier, a finishing mold thereon, means for supplying glass to the parison forming unit and to shape such glass into a parison in said unit, a parison supporting and transfer device associated with said machine, means for rotating said carriers, whereby said parison forming unit and finishing mold are moved in about the same direction through a transfer zone, means for opening the parison mold during the movement thereof toward said transfer zone to leave the parison supported by said transfer device, means for actuating said transfer device to move the parison in a path intersecting the path of the finishing mold at a plurality of points, means for partially closing the finishing mold about the parison at one of said points of intersection, and for thereafter completely closing the finishing mold prior to passing the other point of intersection, and means for releasing the parison from said transfer device substantially simultaneously with the second closing operation of the finishing mold.

8. A glass forming machine comprising a carrier, a parison forming unit including a divided parison mold on said carrier, a second carrier, a divided finishing mold thereon, at least one of said molds being so arranged that the joint thereof is at an angle to a radial line through the axis of its cavity, means for continuously rotating the carriers, and means for transferring a parison from the parison forming unit on the first carrier to the finishing mold on the second carrier, while said carriers are continuously rotating.

9. A glass forming machine comprising a carrier, a parison forming unit including a body mold and a neck mold on said carrier, a finishing mold carrier, a finishing mold thereon, means for continuously rotating said carriers in opposite directions, whereby the molds thereon are caused to travel in closed paths about the axes of their respective carriers, and the neck mold and finishing mold are caused to travel in about the same direction while moving through a transfer zone, means for holding said neck and finishing molds against lateral movement relative to their respective carriers so that the molds move concentrically of the axes of their respective carriers throughout the transfer zone, and come substantially into axial alignment adjacent the line of centers of the carriers, means for supplying glass to the parison forming unit to form a parison therein, means for holding the neck mold and body mold in neck-up position prior to the arrival thereof in the transfer zone, automatic means for opening the parison body mold during the movement of the unit toward the transfer zone, to leave a parison suspended from the neck mold, the described travel of the neck mold and previously opened finishing mold causing the suspended parison to be moved into a position to be enclosed by the finishing mold, automatic means for closing the finishing mold about the parison, and automatic means for opening the neck mold to release the parison to the blow mold prior to the initiation of blowing pressure therein and to permit the neck mold to be carried away from the finishing mold with the parison forming unit.

10. A glass forming machine according to claim 9 comprising automatic snap-acting means for opening the neck mold.

11. In a glassware forming machine in accordance with claim 9, characterized in that the parison forming unit carrier and finishing mold carrier are so positioned relative to each other that the paths of the axial lines of the neck mold and finishing mold intersect at two points.

12. A glass forming machine comprising a carrier, a parison forming unit including a body mold and a neck mold mounted on said carrier, means for holding the neck mold above the plane of the top of the body mold at all times, a finishing mold carrier, a finishing mold thereon, means for continuously rotating said carriers in opposite directions whereby the molds travel in circular paths and the neck mold and finishing mold are moved concentrically to the axes of their respective carriers in about the same direction through a transfer zone, means operative while the neck and finishing molds are so moving for holding them in fixed positions relative to their tables and substantially in axial alignment while crossing the line of centers of the carriers, means for moving the parison forming unit vertically relative to its carrier to dip said unit into contact with a pool of molten glass to charge said unit with glass by suction, and to form the glass into a parison in said unit, automatic means for opening the parison body mold during the movement of the unit toward the transfer zone, to leave the parison suspended from the neck mold, the travel of the neck mold and previously opened finishing mold causing the suspended parison to be moved into a position to be enclosed by the finishing mold, automatic means for closing the finishing mold about the parison, and automatic means for opening the neck mold to release the parison to the finishing mold prior to blowing the parison in the finishing mold and to permit the neck mold to be carried away from the finishing mold with the parison forming unit.

13. A glassware forming machine in accordance with claim 12, and comprising automatic snap-acting means for opening the neck mold.

14. A glass forming machine in accordance with claim 12, characterized in that the parison forming unit carrier and finishing mold carrier are so positioned relative to each other that the paths of the axial lines of the neck mold and finishing mold intersect at two points.

15. A machine for forming glass articles comprising, in combination, a blank mold carriage and a finishing mold carriage arranged side by side and rotatable about vertical axes, a blank mold and a finishing mold mounted respectively on said carriages, a neck mold mounted on the blank mold carriage above and in register with the blank mold, each of said molds comprising separable sections, means for opening the blank mold while rotating with the blank mold carriage and leaving a parison suspended from the neck mold, means for closing the finishing mold around the suspended parison while the finishing mold is rotating with its carriage, a spring operable to open the neck mold while the latter is advancing with the blank mold carriage, and means to bring said spring into activity as the finishing mold completes its closing movement.

16. A glassware forming machine comprising a continuously rotating blank mold carrier, a blank mold thereon, a neck mold associated with the blank mold, a radially fixed mounting on said carrier for said neck mold, said blank mold comprising sections arranged to be separated to leave a blank suspended from the neck mold for movement in a circular path into and through a transfer zone while so suspended, a continuously rotating blow mold carrier positioned laterally of and adjacent the blank mold carrier, a blow mold mounted thereon to move with the carrier in a closed path, means for supporting the blow mold carrier in such a position with respect to the blank mold carrier that the path of the blow mold cavity contacts the path of the blank suspended from the neck mold, means for continuously rotating the blank mold carrier and the blow mold carrier, and means for transferring the blank to the blow mold including automatic means for closing the blow mold about a blank suspended from the neck mold in the transfer zone, whereby the blank may be transferred to the blow mold during the continuous rotation of said carriers.

17. A machine for forming glassware comprising a rotary blank mold carrier, a blank mold unit on said carrier including a blank mold and a neck mold, means for holding said unit in position to be charged with glass for a blank through the end of the blank mold remote from the neck mold, a radially fixed mounting on said carrier for the neck mold, said blank mold being openable to leave a blank suspended from the neck mold for movement while so suspended in a circular path concentric to the axis of the blank mold carrier and extending into and through a transfer zone, a blow mold carrier positioned laterally of and adjacent the blank mold carrier, a blow mold mounted on said carrier for movement therewith in a closed path, means for supporting the blow mold carrier in such position that the path of the blow mold cavity contacts the circular path of the blank suspended from the neck mold in the transfer zone, means for continuously rotating said carriers, and automatic means for transferring the blank to the blow mold, including means for closing the blow mold about the blank suspended from the neck mold in the transfer zone, said closing means constituting means for holding the blow mold closed beyond said zone, whereby the blank may be blown in the blow mold during the continuous rotation of said blow mold.

18. A glassware forming machine according to claim 17 wherein said blow mold closing means comprises a stationary cam and connections to the blow mold operated by said cam, adapted to first close the mold about the suspended blank in the circular path of movement thereof in the transfer zone, and to thereafter hold the blow mold closed about the blank as it moves away from said zone.

19. The method of fabricating glassware which comprises continuously rotating a blank mold and associated neck mold substantially horizontally about one axis in one direction and in a closed path passing through a charging zone and a transfer zone, charging said molds with glass for a blank through the end of the blank mold remote from the neck mold in the charging zone, opening the blank mold to leave a blank suspended from the neck mold, holding the neck mold and suspended blank at a fixed radial distance from said axis while moving them in a circular path into and through said transfer zone, continuously rotating a blow mold horizontally in a different direction in a closed path eccentric to the first-named path but such that the path of the cavity of the blow mold contacts the circular path of the suspended parison in the transfer zone, closing the blow mold about the suspended blank in the transfer zone, and releasing the blank from the neck mold to the blow mold in said zone, and prior to blowing the blank in the blow mold, and subsequently initiating the blowing of the blank in the blow mold, all of said operations being performed while the molds are being continuously moved in their respective paths.

20. The combination of a parison mold table, parison molds thereon, neck molds associated with the parison molds, radially fixed mountings for the neck molds, said parison molds being openable when below the neck molds to leave parisons suspended from the neck molds, a finishing mold table, finishing molds thereon, said tables being arranged side by side, automatic means for continuously rotating said tables in opposite directions, means for so supporting said tables that said neck molds and parisons and finishing molds are moved in paths which are substantially tangent in a transfer zone, and automatic means operating in synchronism with the movements of the mold tables for successively transferring parisons from the parison molds to the finishing molds in said transfer zone.

21. Apparatus for shaping glassware comprising a pair of rotary carriers disposed side by side, means for continuously rotating said carriers, a series of blank molds carried by one of said carriers, a neck mold associated with each blank mold, means for holding each neck mold at a fixed radial distance from the axis of the blank mold carrier during the travel thereof throughout a transfer zone, a series of blow molds mounted on the other of said carriers and adapted to successively close about blanks previously left suspended from the neck molds by the opening of the blank molds, automatic means for successively closing the blow molds about the blanks in the transfer zone adjacent the point of nearest approach of the paths of travel of said associated blank and neck molds and blow molds, while all of said molds are rotating, and means for supporting the blow molds and blank molds so that the upper surfaces of said blow molds are disposed in substantially the same plane as the upper surfaces of said blank molds, at least when the blow molds are closed about the blanks suspended from the neck molds.

22. A glassware forming machine embodying a carrier mounted for rotation about a vertical axis, means for continuously rotating said carrier, sectional blank and neck molds on the carrier, pivotal mountings on the carrier for said molds, means for holding the mounting of each neck mold at a fixed radial distance from the axis of the carrier at least during movement of the neck mold toward and through a transfer zone, whereby rotation of the first carrier moves the neck mold in a circular path concentric to the axis thereof for a transfer operation, means for opening the blank mold to leave a blank suspended from the neck mold for movement while so suspended in the circular path of the neck mold through the transfer zone, a sectional blow mold, means for continuously rotating the blow mold in a closed path eccentric to but adjacent the path of the suspended blank, means for closing the blow mold about the suspended blank, and means for opening the neck mold to release the blank in the blow mold prior to blowing the blank in the blow mold.

23. The combination of a parison mold table, a parison mold on said table, means associated with the parison mold for supporting a parison in neck-up position when said mold is opening, means for mounting the parison supporting means on said table for rotation substantially in a circle about the axis of said table, a finishing mold table, a finishing mold thereon, said tables being arranged side by side, automatic means for continuously rotating said tables in opposite directions whereby the said parison mold and finishing mold are continuously moving, and automatic means associated with said molds and parison supporting means, and operating in synchronism with the movements of the mold tables for transferring a parison from the parison mold to the finishing mold by said parison supporting means while said molds are moving.

24. A glassware forming machine comprising a blank mold table, a blank mold thereon, a neck mold constantly carried by said table and associated with said blank mold, means for holding said molds in position to receive glass for a parison through the end of the blank mold remote from the neck mold, a finishing mold table, a finishing mold thereon, means for continuously rotating said tables in opposite directions, the said blank molds and blow molds being so arranged on their respective tables that they arrive simultaneously on a line connecting the axes of said tables in a transfer zone, means operating in synchronism with the rotation of said tables to open the blank mold as it approaches the transfer zone to leave a previously formed parison suspended from the neck mold, means for holding the neck mold and suspended parison in radially fixed position during movement thereof into and through the transfer zone, means for closing the blow mold about the suspended parison in said zone, and means for opening the neck mold to release the parison, the said blow mold and neck mold operating means being so timed that the parison is fully released from the neck mold substantially simultaneously with the completion of the closing of the blow mold.

25. The method of forming glassware which comprises continuously rotating a blank mold and an associated neck mold adapted jointly to form a blank, in a closed path passing through a charging zone and a transfer zone, holding said molds in position to be charged with glass in the charging zone through the end of the blank mold remote from the neck mold, holding the molds in neck-up position in said path while opening the blank mold to leave a blank suspended from the neck mold for movement while suspended through the transfer zone, moving the suspended blank in a circular path about its axis of rotation in the transfer zone, continuously rotating a blow mold in a direction opposite to that in which the blank and neck molds are rotated, and in a closed path laterally of the path of the blank and neck molds, but such that the path of the blow mold cavity contacts the circular path of the suspended blank in the transfer zone, closing the blow mold about the blank, releasing the blank in the blow mold prior to blowing the blank therein, and so controlling the release of the blank from the neck mold and the closing of the blow mold that the blank is fully released from the neck mold substantially simultaneously with the completion of the closing of the blow mold.

26. A machine for forming glassware comprising a blank mold carrier, a blank mold and associated neck mold thereon adapted to form a blank, means for continuously rotating said carrier to move the molds past a charging zone and a transfer zone, means for positioning the molds to receive glass for a blank through the end of the blank mold remote from the neck mold, means for holding said molds in position for the blank mold to be opened leaving a blank suspended from the neck mold for travel while so suspended into and through the transfer zone, and for holding said neck mold and suspended blank at a fixed radial distance from the axis of said carrier at least during movement thereof toward and through the transfer zone, to cause the suspended blank to move in a circular path concentric to the axis of the carrier in said transfer zone, a blow mold carrier positioned laterally of but adjacent to the blank mold carrier, a blow mold on said last-named carrier movable with its carrier in a closed path such that the path of the cavity of said mold passes through the circular path of the suspended blank in the transfer zone, means for supporting the blank and blow molds on their respective carriers so that the neck-end portion of the blank mold and the top of the blow mold lie in substantially the same horizontal plane in the transfer zone, automatic means for continuously rotating said blow mold carrier in a direction opposite to the direction of rotation of the blank mold carrier, the blank and neck mold and the blow mold being so arranged on their respective carriers, and the carriers being driven in such timed relation that said molds arrive simultaneously on the line of centers of the carriers in the transfer zone, and automatic means for transferring the suspended blank to the blow mold including automatic means for closing the blow mold about the suspended blank in the transfer zone and for holding the blow mold closed about the blank a substantial distance beyond said zone to blow the blank during the continuous travel of the blow mold.

27. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for rotating said carriers in opposite directions, and means for directly transferring the blank from the neck mold to the blow mold during the rotation of said carriers, including automatic means for closing the blow mold about the blank while the blank is suspended from the neck mold.

28. A glassware forming machine comprising a rotary blank mold carrier, a blank mold thereon, a neck mold associated with the blank mold, said blank mold being openable to leave a blank suspended from the neck mold, a rotary blow mold carrier eccentric to the blank mold carrier, a blow mold thereon, automatic means for rotating said carriers in opposite directions to move the blank and neck molds and the blow mold into and through a transfer zone, means for holding the blank mold and neck mold in neck-up position during opening of the blank mold and while the neck mold and suspended blank are moving into the transfer zone, means for directly transferring the blank from the neck mold to the blow mold during rotation of the carriers including automatic means for closing the blow mold about the blank while the blank is suspended from the neck mold, said mold closing means constituting at least in part means for retaining the blow mold closed after the transfer operation is completed for the shaping of the blank in the blow mold.

29. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for continuously rotating said carriers in opposite directions, means for holding said carriers in such positions and for so holding the molds on the respective carriers that the neck mold and blow mold come substantially into axial alignment in a transfer zone, means for directly transferring the blank from the neck mold to the blow mold during rotation of the carriers, including automatic means for closing the blow mold about the blank while the blank is suspended from the neck mold in the transfer zone, said closing means also comprising means for retaining the blow mold closed about the blank during rotation of the blow mold away from the transfer zone out of alignment with the neck mold, and to oppose blowing pressure in said blow mold, and a blow head carried by the blow mold carrier for initiating blowing pressure in the blow mold after the blow mold has moved out of alignment with the neck mold.

30. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, means for mounting the blow mold on the blow mold carrier at a radially fixed distance from the axis of rotation of said carrier, automatic means for rotating said carriers in opposite directions, and means for directly transferring the blank from the neck mold to the blow mold during the rotation of said carriers, including automatic means for closing the blow mold about the blank while the blank is suspended from the neck mold.

31. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for rotating said carriers in opposite directions, including means for so timing the rotation of said carriers that the blank and neck molds and the blow mold arrive simultaneously on the line of centers of said carriers, means for directly transferring the blank from the neck mold to the blow mold during the rotation of said carriers, including automatic means for closing the blow mold about the blank while the blank is suspended from the neck mold, and means for so supporting the blank mold and blow mold on their respective carriers that the tops thereof lie in substantially the same plane, at least during the closing of the blow mold about the blank.

32. A glassware forming machine comprising a rotary blank mold carrier, a blank mold thereon, a neck mold associated with the blank mold, means for holding the blank mold and neck mold in a position to be charged with glass for a blank through the end of the blank mold remote from the neck mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for rotating said carriers in opposite directions, means for directly transferring the blank from the neck mold to the blow mold during the rotation of said carriers, including automatic means for closing the blow mold about the blank while the blank is suspended from the neck mold, and means for shaping the blank in the blow mold during further rotation of its carrier including blowing means, and means for holding the blow mold closed.

33. A glassware forming machine comprising a rotary blank mold carrier, a blank mold thereon, a neck mold associated with the blank mold, means for holding the blank mold and neck mold in a position to be charged with glass through the end of the blank mold remote from the neck mold, said blank mold being thereafter openable to leave a blank suspended from the neck mold, means for holding the neck mold above the blank mold when the blank mold is opening, a rotary blow mold carrier eccentric to the blank mold carrier, a blow mold on the blow mold carrier, automatic means for continuously rotating said carriers in opposite directions, including means for so timing the rotation of the carriers that the molds on the respective carriers simultaneously arrive on the line of centers of the carriers, means for so holding the blank and blow molds on their respective carriers that the tops thereof lie in substantially the same plane at least upon arrival thereof on said line of centers, means for directly transferring the blank from the neck mold to the blow mold during rotation of the carriers, including automatic means for closing the blow mold about the blank while the blank is suspended from the neck mold, automatic means for retaining the blow mold completely closed about the blank during rotation of the blow mold away from a point beyond the line of centers of the carriers, and a blow head on the blow mold carrier adapted to engage the blow mold beyond said line of centers, to blow the blank in the blow mold.

34. The method of fabricating glassware which comprises continuously rotating a blank mold and associated neck mold substantially horizontally about one axis in one direction in a closed path passing through a charging zone and a transfer zone, charging said molds with glass for a blank in the charging zone, holding the blank mold and neck mold in neck-up position during rotation through said path, opening the blank mold to leave a blank suspended from the neck mold, moving the suspended blank into and through said transfer zone, continuously rotating a blow mold horizontally in a different direction from that of the blank and neck molds in a closed path eccentric to the first-named path, but such that the path of the blow mold cavity contacts the path of the blank suspended from the neck mold in the transfer zone, closing the blow mold about the blank suspended from the neck mold in the transfer zone, releasing the blank from the neck mold to the blow mold in said zone prior to blowing the blank in the blow mold, and subsequently initiating the blowing of the blank in the blow mold, all of said operations being performed while the molds are being continuously moved in their respective paths.

35. The method of fabricating glassware which comprises continuously rotating a blank mold and associated neck mold, adapted to form a blank, substantially horizontally about one axis in one direction and in a closed path passing through a charging zone and a transfer zone, charging said molds with glass for a blank in the charging zone through the end of the blank mold remote from the neck mold, holding the blank mold and neck mold in neck-up position during rotation thereof through said path beyond the charging zone, opening the blank mold to leave a blank suspended from the neck mold for movement while so suspended into said transfer zone, continuously rotating a blow mold horizontally in a different direction from that of the blank and neck molds in a closed path eccentric to the first-named path but such that the path of the cavity of the blow mold contacts the circular path of the suspended parison in the transfer zone, closing the blow mold about the suspended blank in the transfer zone, and releasing the blank from the neck mold to the blow mold in said zone, and prior to blowing the blank in the blow mold, and subsequently initiating the blowing of the blank in the blow mold, all of said operations being performed while the molds are being continuously moved in their respective paths.

36. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a blow mold carrier, a blow mold on the blow mold carrier, automatic means for rotating said carriers in opposite directions, means for supporting the carriers in such adjacent relation and for so holding the neck mold and blow mold on their respective carriers that the path of the blow mold cavity is substantially tangent to the path of the blank left suspended from the neck mold, and means for directly transferring the blank from the neck mold to the blow mold during the rotation of said carriers, including automatic means for closing the blow mold about the blank while the blank is suspended from the neck mold.

37. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for rotating said carriers in opposite directions, means for supporting the carriers in such adjacent relation and for so holding the neck mold and blow mold on their respective carriers that the path of the axial center line of the blow mold cavity intersects the path of the axial center line of the blank left suspended from the neck mold at a plurality of points, and means for directly transferring the blank from the neck mold to the blow mold during the rotation of said carriers, including automatic means for closing the blow mold about the blank while the blank is suspended from the neck mold.

38. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for rotating said carriers in opposite directions, including means for so timing the rotation of said carriers that the blank and neck molds and the blow mold arrive simultaneously on the line of centers of said carriers, means for supporting the carriers in such adjacent relation and for so holding the neck mold and blow mold on their respective carriers that the path of the center line of the blow mold cavity intersects the path of the center line of the blank left suspended from the neck mold at a plurality of points, and means for directly transferring the blank from the neck mold to the blow mold during the rotation of said carriers, including automatic means for closing the blow mold about the blank while the blank is suspended from the neck mold, means for opening the neck mold and means for so timing the last two means that the blow mold is partially closed about the blank at the first point of intersection and the transfer of the blank is completed at least by the time that the molds arrive at the last point of intersection.

39. A glassware forming machine comprising a rotary blank mold carrier, a blank mold thereon, a neck mold associated with the blank mold, said blank mold being openable to leave a blank suspended from the neck mold, means for holding the neck mold above the blank mold when the blank mold is opening, a rotary blow mold carrier eccentric to the blank mold carrier, a blow mold on the blow mold carrier, automatic means for continuously rotating said carriers in opposite directions, including means for so timing the rotation of the carriers that the molds on the respective carriers simultaneously arrive on the line of centers of the carriers, means for so supporting the blank and neck molds and the blow molds that the tops of the blank and blow molds lie in substantially the same plane at least upon arrival thereof on said line of centers, and the paths of the suspended blank and the cavity of the blow mold contact adjacent to said line of centers, means for directly transferring the blank from the neck mold to the blow mold during rotation of the carriers, including automatic means for closing the blow mold about the blank while the blank is suspended from the neck mold, automatic means for retaining the blow mold completely closed about the blank during rotation of the blow mold away from a point beyond the line of centers of the carriers, and a blow head for initiating blowing pressure in the blow mold beyond the line of centers of the carriers.

40. Glassware forming machine comprising a rotary blank mold carrier, a blank mold thereon, a neck mold associated with the blank mold, said blank mold being openable to leave a blank suspended from the neck mold, means for holding the neck mold and associated blank mold at all times against relative bodily movement and for holding the neck mold above the blank mold when said blank mold is opening, a rotary blow mold carrier eccentric to the blank mold carrier, a blow mold on the blow mold carrier, automatic means for rotating said carriers in opposite directions, and means for directly transferring the blank from the neck mold to the blow mold during the rotation of said carriers, including automatic means for closing the blow mold about the blank while the blank is suspended from the neck mold.

41. A glass forming machine comprising a carrier, a parison forming unit mounted on said carrier, a second carrier, a finishing mold thereon, means for supplying glass to the parison forming unit and to shape such glass into a parison in said unit, a parison supporting and transfer device associated with said machine, means for continuously rotating said carriers, whereby said parison forming unit and finishing mold are moved in about the same direction through a transfer zone, means for opening the parison mold during the movement thereof toward said transfer zone to leave the parison supported by said transfer device, means for actuating said transfer device to move the parison in a path intersecting the path of the finishing mold at a plurality of points, means for partially closing the finishing mold about the parison at one of said points of intersection, and for thereafter completely closing the finishing mold prior to passing the other point of intersection, and means for releasing the parison from said transfer device substantially simultaneously with the second closing operation of the finishing mold.

42. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a flow mold on the blow mold carrier, automatic means for continuously rotating said carriers in opposite directions, means for supporting the carriers in such adjacent relation and for so holding the neck mold and blow mold on their respective carriers that the path of the axial center line of the blow mold cavity intersects the path of the axial center line of the blank left suspended from the neck mold at a plurality of points, and means for directly transferring the blank from the neck mold to the blow mold during the rotation of said carriers, including automatic means for closing the blow mold about the blank while the blank is suspended from the neck mold.

43. A glassware forming machine comprising a rotary blank mold carrier, a blank mold thereon, a neck mold associated with the blank mold, said blank mold being openable to leave a blank suspended from the neck mold, means for holding the neck mold above the blank mold when said blank mold is opening, a rotary blow mold carrier eccentric to the blank mold carrier, a blow mold on the blow mold carrier, automatic means for continuously rotating said carriers in opposite directions, including means for so timing the rotation of said carriers that the blank and neck molds and the blow mold arrive simultaneously on the line of centers of said carriers, means for supporting the carriers in such adjacent relation and for so holding the neck mold and blow mold on their respective carriers that the path of the center line of the blow mold cavity intersects the path of the center line of the blank left suspended from the neck mold at a plurality of points, and means for directly transferring the blank from the neck mold to the blow mold during the rotation of said carriers, including automatic means for closing the blow mold about the blank while the blank is suspended from the neck mold, means for opening the neck mold and means for so timing the last two means that the blow mold is partially closed about the blank at the first point of intersection and the transfer of the blank is completed at least by the time that the molds arrive at the last point of intersection.

44. In a glass forming machine, in combination with a rotating blank mold table, a blank mold carried thereby, a rotating finishing mold table, a finishing mold carried thereby, said tables being laterally spaced apart and arranged side by side, of automatic means for transferring the parison from the parison mold to the finishing mold including means to disengage the parison from the parison mold to expose it, neck molds mounted on the blank mold table engaging the neck end of the parison to support it as exposed by the blank mold, means for moving the neck molds and parison toward the approaching finishing mold and in a path non-axial, but intersecting the path of the finishing molds at a common point where the molds are in radial alignment, means for partially closing the finishing mold around the parison upon approaching the common point and before the parison and finishing molds are in axial alignment, and means for releasing the parison from its neck ring at the common point to complete transfer and permit the parison to be moved away therefrom with the finishing mold.

45. Automatic transfer mechanism for glass forming machines, comprising means for supporting a hot glass parison by its neck end, a rotatable receiving mold, means for moving the parison and receiving mold in synchronism through separate non-axial circular paths, intersecting at a single transfer point, means for partially closing the receiving mold about the non-axially moving parison, and means for disengaging the supporting means from the parison at the transfer point.

KARL E. PEILER.